United States Patent [19]

Katz et al.

[11] 3,966,640

[45] June 29, 1976

[54] SUPPORTED COBALT SULFATE DESULFURIZATION CATALYST

[75] Inventors: Sheldon B. Katz, Cleveland; Frederick J. Burton, Jr., Bay Village; Leonard A. Cullo, Solon, all of Ohio

[73] Assignee: The Harshaw Chemical Company, Cleveland, Ohio

[22] Filed: June 28, 1974

[21] Appl. No.: 483,982

[52] U.S. Cl. .............................................. 252/440
[51] Int. Cl.² ........................................... B01J 27/02
[58] Field of Search ............................ 252/440, 463

[56] References Cited
UNITED STATES PATENTS

| | | | |
|---|---|---|---|
| 2,748,062 | 5/1956 | Doumani | 252/440 |
| 2,871,200 | 1/1959 | Doumani | 252/440 |
| 2,871,201 | 1/1959 | Doumani | 252/440 |
| 3,238,272 | 3/1966 | Nixon | 252/440 |
| 3,632,620 | 1/1972 | Kober et al. | 252/440 |
| 3,776,854 | 12/1973 | Dautzenberg | 252/463 |
| 3,853,789 | 12/1974 | Warthen et al. | 252/463 |
| 3,873,470 | 3/1975 | Conway et al. | 252/463 |

*Primary Examiner*—Helen M. McCarthy
*Assistant Examiner*—Mark Bell
*Attorney, Agent, or Firm*—Alfred D. Lobo; James A. Lucas

[57] ABSTRACT

A catalyst is provided which is useful in the direct single-step conversion of sulfur oxides to element sulfur. The catalyst comprises cobalt sulfate as an essential catalytic ingredient supported on an attrition resistant and decrepitation-resistant catalyst support wherein cobalt is present in an amount less than ten parts cobalt per hundred part by weight of catalyst.

10 Claims, No Drawings

SUPPORTED COBALT SULFATE DESULFURIZATION CATALYST

BACKGROUND OF THE INVENTION

This invention relates to a desulfurization catalyst comprising cobalt sulfate as an essential catalytic ingredient supported on a catalyst support. The catalyst permits the single-step conversion of sulfur oxides present as gases in stack gases and the like. By the term "sulfur oxides" we refer herein to both sulfur dioxide and sulfur trioxide. This one-step conversion of sulfur oxides, and particularly sulfur dioxide, to elemental sulfur which is not adsorbed on the catalyst but is discharged as elemental sulfur in the effluent from the catalyst bed, eliminates the conventional second-step regeneration of a 'catalyst' bed and reduction of sulfur loaded upon conventional metal oxide acceptors, or in the alternative, of conversion of catalytically produced $H_2S$ to elemental sulfur.

Conventionally, sulfur oxides are removed from gaseous mixtures such as stack or flue gases and smelter off-gases by contact with metal or metal oxide acceptors such as copper or copper oxide, respectively, on a refractory carrier material such as alumina. During contact, sulfur oxides are accepted by the metal or metal oxide, so that the purified gases, if discharged via a stack, cause substantially no air pollution. The metal sulfate, for example copper sulfate formed during acceptance, may be subsequently decomposd by means of reducing gas, the result being a regenerated acceptor and a sulfur dioxide-rich gas, which can be used, for example, to produce elemental sulfur or sulfuric acid. The regenerated acceptor can then be reused to purify a further quantity of gas containing sulfur oxides. In this two-step prior art process, the regeneration of the acceptor oxide, which is sometimes referred to as 'catalyst', is a difficult problem which often forms combustible deposits on the acceptor during the regeneration process. The combustible deposits are undesirable since their combustion during use of the regenerated acceptor causes a significant increase in temperature which adversely affects the acceptor life. More importantly, the two-step process requires that an inordinate expenditure of time be devoted to regeneration of the acceptor, the expenditure of which time is an economic deterrent.

Even in those instances where a single-step conversion of sulfur dioxide to elemental sulfur may be effected with an appropriate catalytic component suitably supported on a carrier, it has been found that the exotherms to which the catalyst is normally subjected, along with the reactions of the stack-gas components with the catalyst components, results in the decrepitation or disintegration of the catalyst so that a bed of catalyst soon develops so high a pressure drop as to become unusable. The problem of selecting a catalyst which is stable, has a desirable activity which may be supported on a support which will not interfere with the activity of the catalyst and yet defy attrition and decrepitation, at the same time permitting a conversion of sulfur dioxide to element sulfur in excess of 90 percent, has been a problem to which a great deal of effort has been devoted (see Removal of Sulfur dioxide from stack gases by Catalytic Reduction to Elemental Sulfur with Carbon Monoxide, Robert Querido and W. Leigh Short, "Ind. Eng. Chem. Process Des. Develop.", Vol. 12, No. 1, 1973). The catalyst of our invention is a solution to that problem.

U.S. Pat. No. 3,495,941 discloses a typical prior art desulfurization catalyst utilizing vanadium oxide supported on a carrier material. Also disclosed therein is cobalt molybdate which is disclosed for the reduction of sulfur dioxide with methane. In either case, sulfur dioxide is reduced to hydrogen sulfide which is thereafter converted to elemental sulfur.

Many chemical processes currently in commercial use employ catalysts which undergo a change in crystalline structure during the course of reaction. Such catalysts are particularly susceptible to attrition and other types of physical degradation. The desulfurization catalyst of our invention consists essentially of cobalt sulfate in crystalline form supported on an attrition resistant support such as gamma-alumina. However, formed gamma-alumina shapes do not maintain their physical strength, particularly at elevated temperature operation up to about 700°C, and thus are not sufficiently decrepitation resistant. By 'attrition resistant' catalyst is meant that the catalyst resists abrasion more or less, at or near the surface, while a general loss of strength of a shaped catalyst pellet is usually referred to as decrepitation or disintegration. Decrepitation of a catalyst pellet often permits it to be crushed by pressure between the thumb and forefinger. Numerous prior art catalysts have utilized clays of various types as an ingredient for a catalytic support. In most instances, the clay containing support is used as a binder and the catalyst support is thereafter fired to decompose the catalytic ingredient present in the form of a salt or hydroxide to the oxide form. In particular, U.S. Pat. No. 3,146,210 to Baldwin teaches the preparation of attrition-resistant alumina, beryllia, and zirconia catalyst pellets which can be used as catalyst supports by subsequent impregnation of the pellets with metallic salts. Attrition resistance and the maintenance of the physical strength of a supported catalyst are serious problems to which much attention has been devoted. Baldwin made no reference to the use of clay to enhance attrition and decrepitation resistance and thus, overlooked the discovery that clays can provide surprising transverse and crush strength to a tableted or pelleted alumina support.

The term "clay" when used in context with the present invention, is to be interpreted in the broadest sense and this invention is not limited by subtle differences and the composition of substances which were or could be classified in the broad sense as clays. Thus, a clay may be defined as "an earthy or stoney mineral aggregate consisting essentially of hydrous silicates and alumina, plastic when sufficiently pulverized and wetted, rigid when dry, and vitreous when fired at sufficiently high temperatures." Alternatively, a clay may be broadly defined as a "mixture of hydrous silicates of aluminum, iron, and magnesium with or without other rock and mineral particles, said clays being characterized by extreme fineness of particles (often colloidal in size) and by wide variations in physical and thermal (ceramic) properties and in mineral and chemical composition." Other definitions of the term "clay" may be found in the following volumes and the references contained therein and such clays are useful in the present invention:

Thorpes Dictionary of Applied Chemistry, J. F. Thorpe and M. A. Whiteley, Volume 3, Fourth Edition, Longmans, Green and Co., New York (1953)

Encyclopedia of Chemical Technology, Kirk-Othmer, Volume 6, Second Edition, Inter-Science publishers, New York (1965).

The preferred clays for use with our invention include: the kaolin group, including for example, kaolinite, dickite, nacrite, anauxite, halloysite, and endellite; the montmorillonite group, including for example, montmorillonite, beidellite, nontronite, hectorite, saponite, saucounite, and bentonite; the attapulgite and sepiolite group, including for example, attapulgite taken from the region of Attapulgus, Ga.; the high alumina clays, including for example, diaspore, boehmite, Gibbsite, and cliachite; and also the ball clays found principally in Kentucky and Tennessee and the fire clays produced in Missouri, Illinois, Ohio, Kentucky, Mississippi, Alabama, and Arkansas. Mixtures of the forementioned clays are likewise useful in the present invention as the clay portion of the binder.

SUMMARY OF THE INVENTION

It has been discovered that crystalline cobalt sulfate particles deposited on an attrition-resistant catalyst support permits the direct, single-step conversion of gaseous sulfur oxides to elemental sulfur in the presence of reducing gas and requires no secondary recovery steps, and no regeneration of the catalyst.

It is therefore a general object of this invention to provide a supported catalyst, having cobalt sulfate as its essential catalytic ingredient, for the desulfurization of stack-gases which typically contain nitrogen, sulfur dioxide, sulfur trioxide, carbon monoxide, carbon dioxide, oxygen and small quantities of other gases.

It is a specific object of the instant invention to provide a supported cobalt sulfate desulfurization catalyst which is not affected by the presence of reducing gases, relatively free of particulate matter, concurrently introduced into a gaseous stream containing sulfur oxides, and which is remarkably resistant to poisoning.

It is still another object of the instant invention to provide a supported cobalt sulfate catalyst which is effective with conventional reducing agents including low molecular weight hydrocarbons, CO and $H_2$ intermixed with stack gases or smelter off-gas; and, to provide a catalyst which is surprisingly insensitive to the concentration of $SO_2$, $SO_3$, $H_2S$, minor quantities of COS and the like.

It is a specific object of this invention to provide a continuously operable desulfurization catalyst which does not require burning hydrocarbons over the catalyst to regenerate it, thus avoiding deposition of carbon on the surface of the catalyst.

It is a still more specific object to provide an impregnated desulfurization catalyst containing as its essential catalytic ingredient cobalt sulfate supported on a porous catalyst support by impregnation thereof, so that the supported porous catalyst contains from about ½ to about 10 parts by weight cobalt per hundred parts by weight supported catalyst.

It has been discovered that calcined, porous gamma alumina conventionally impregnated with coblat sulfate provides an immediately active and effective desulfurization catalyst for the removal of in excess of 90% of sulfur oxides from stack-gases, but suffers the disadvantage of disintegrating relatively easily, so that its use, particularly in a packed bed reactor, is seriously limited.

It has also been discovered that an attritionresistant desulfurization catalyst support having relatively high surface area, high porosity and high crush strength, can be prepared by blending clay or a clay-talc mixture with gamma-alumina, adding sufficient moisture to make the blend pliant, shaping the pliant mixture into tablets or the like, and calcining the tablets at a temperature above about 1000°C for a time sufficient to harden the support and give it physical strength.

It is therefore a general object of this invention to provide a desulfurization catalyst comprising cobalt sulfate as an essential catalytic ingredient supported on a mixture of calcined gamma-alumina and clay, which mixture provides a porous catalyst support surprisingly resistant to attrition and degradation, and, unexpectedly provides greater stability and longer life than cobalt sulfate supported on either gamma-alumina alone, or, on clay alone.

It is a specific object of this invention to provide a highly porous, attrition-resistant catalyst support impregnated with cobalt sulfate which is crystallized thereupon and which is present during use at all times, along with minor amounts of cobalt sulfide formed during use, which support retains its porosity during operation and does not get 'loaded' as do metal oxide acceptors.

It is still another specific object of this invention to provide a supported cobalt sulfate desulfurization catalyst, the support consisting essentially of gamma-alumina and bentonite, and the supported catalyst having essentially the same crush strength before and after use in a desulfurization reactor.

These and other objects, features and advantages of this apparatus will become apparent to those skilled in the art from the following description of preferred forms thereof and the examples set forth herein.

DETAILED DESCRIPTION OF PREFERRED EMBODIMENTS OF THE INVENTION

The supported cobalt sulfate catalyst disclosed herein is composed wholly of cobalt sulfate supported on an attrition-resistant catalyst support. Calcined catalyst support is impregnated with cobalt sulfate and the impregnated catalyst is not thereafter calcined. The unsupported catalyst of the instant invention is not an effective catalyst. It appears essential that the cobalt sulfate be supported sufficiently to provide sufficiently dispersed active centers such as those provided when at least 50 percent by weight of the supported catalyst constitutes catalyst support. It is preferred that in excess of 90 percent by weight of the supported catalyst consist of support. Any known catalyst support such as alumina, pumice, silicon carbide, zirconia, titania, alumina, bentonite, the inorganic phosphates, borates, and carbonates stable under the reaction conditions, may be used but gamma-alumina is preferred. Porous catalysts are preferred, catalysts with large pore volumes per unit weight of catalyst, though not necessarily of large pore diameter, giving the best results. Commercial gamma-alumina grades having an average pore diameter of about 100A, with a pore volume in excess of 0.6 ml/g and a specific surface area of from about 50–200m$^2$/g are particularly suitable. Most preferred because of its attrition-resistance, is a mixture of gamma-alumina and bentonite. Silica and supports containing a relatively large amount of silica such as silica-alumina are substantially inferior catalyst supports for the present purpose, as is alpha-alumina.

In the preparation of the desulfurization catalyst useful in this invention, the cobalt sulfate can be blended together with the catalyst support or can be formed in situ. Cobalt sulfate is the essential catalytic ingredient of the instant desulfurization catalyst and the critical requirement is that the cobalt sulfate remains in a finely divided crystalline form in the finished catalyst, without being converted to the oxide, though a minor amount of cobalt sulfide may be formed. It is distinct from cobalt oxide supported on a suitable support, which after continued exposure to sulfur oxides acts as an acceptor of sulfur and is progressively converted to cobalt sulfate which loads the catalyst support and must thereafter be driven off so as to regenerate the acceptor. In the catalyst of our invention, there is no step requiring activation of the catalyst because the catalyst is active when impregnated, or regeneration of the loaded catalyst, because the catalyst is not loaded and the pores remain open.

The catalyst support may be prepared by any conventional method; it may be extruded, tableted or spherodized, preferably in such a manner as to provide good crush strength after the support is calcined. Attrition resistance of our catalyst is of especial importance where impregnated catalyst is used in a fluid bed reactor.

Whether the catalyst is to be used in a fluid bed or fixed bed reactor, active catalyst is formed simply by impregnating the calcined catalyst support with cobalt sulfate, preferably in the form of a diluted solution so as to provide from about 1 to about 10 percent by weight cobalt on the catalyst support. Additional quantities of cobalt may be used but the economics of providing in excess of 10% cobalt do not justify such an excess.

Impregnated catalyst is generally dried for convenience, prior to use in a reactor, and the extent to which it is dried is a matter of choice. Irrespective of the conditions of drying of the catalyst, the temperature is insufficient to convert a significant amount of cobalt sulfate to cobalt oxide, and the catalytic activity is not enhanced by drying at elevated temperatures.

Minor amounts of metal sulfates other than cobalt sulfate may be present in the desulfurization catalyst but the presence of these minor amounts does not appear to enhance the activity of the catalyst, and no deliberate effort is made to provide such additional materials. During operation, a minor amount of cobalt sulfide is formed, generally less than 20 percent of all the cobalt present initially as cobalt sulfate.

The surprising advantage of the catalyst of this invention is that it permits a one-step process for converting sulfur oxides to elemental sulfur at conversions in excess of 90 percent at very high mass velocities. This is particularly surprising because the sulfate anion is known to sterically hinder catalytic activity of the cation. The activity of the catalyst is particularly insensitive to the concentration of sulfur oxides to be converted. Essentially complete conversion of sulfur oxides, independent of their concentration, is of particular value in desulfurization of stack gases containing about 1% $SO_2$, and smelter off-gases which may contain about 15% $SO_2$ or more. To effect this one-step conversion, the stack-gases or smelter off-gases containing sulfur oxides are premixed with a sufficient amount of reducing gas to reduce the sulfur oxides and to eliminate any oxygen or oxidizing gases present in the stack gases to be contacted with the catalyst. Reducing gases such as are produced by partial combustion in prior art twostep processes, for example, the lower hydrocarbons having from about 1 to about 5 carbon atoms, and more particularly methane, ethane, propane and butane, are preferred. $H_2S$, $H_2$ and CO may also be used in place of the lower hydrocarbons, or in additions thereto, as is known in the art, mixtures of CO and $H_2$ being preferred. The amount of reducing gas used depends on the composition of the gas and the yield of elemental sulfur desired. Sufficient CO and $H_2$ is provided to react with all oxygen present as $SO_2$, $SO_3$ or nitrogen oxides ($NO_x$). If $O_2$ is present, sufficient additional CO is added to convert it to $CO_2$, but excess CO is to be avoided because it forms carbon oxysulfide (COS). It is preferred to have a slight excess molar ratio of reducing gas to sulfur dioxide and other gases to be reduced, with only a very slight excess of CO in the reducing gas. In general, less than 10% excess CO is preferred.

It is essential, for the single-step conversion of sulfur oxides catalytically to elemental sulfur, that CO be present in the reducing gas as a necessary reductant. Though CO is conveniently obtained by incomplete combustion of lower hydrocarbons it is preferred to tailor the composition of stack gases so as to contain a substantial amount of CO. Additional CO, as required, may be provided by the incomplete combustion of coal where lower hydrocarbons are uneconomic, or by regulated reduction in a bed of scrap steel, in a prior processing step. Yet another procedure which can be used with metallurgical smelters, is to use a bed of coke to generate the needed CO from unreacted oxygen. The choice of any of the foregoing methods of providing CO as a reductant, all of which are known in the art, depends on the particular process, conditions and requirements of the desulfurizaton catalyst.

The temperature at which desulfurization is conducted may vary considerably depending upon the composition of the stack-gases, the particular make up of the supported catalyst, the physical characteristics of the reactor in which the catalyst operates, the particular sulfur oxides present in the stack-gases, the particular reducing gases used and the correlated conditions of the rate of through-put or contact time, and, the ratio of sulfur oxides to reducing gas. In general, when operating at pressure near atmospheric, that is from about $-10$ psig to about 100 psig, temperatures in the range from about 300°C to about 700°C may be advantageously employed. However, the process may be conducted at other pressures, and in the case where superatmospheric pressures, e.g., above 100 psig, are employed, somewhat lower temperatures may be desirable. In the preferred embodiment where the process is employed to convert sulfur oxides to elemental sulfur, wherein sulfur dioxide is present in the range from about 10 to about 12 percent, a temperature range of 400°C to 700°C has been found to be desirable at about atmospheric pressure.

Typical stack gas and smelter off-gas compositions are as follows:

| Stack gas*<br>Volume % | | Copper Roaster<br>Gas<br>Volume % | | Copper Converter<br>Gas<br>Volume % | |
|---|---|---|---|---|---|
| $SO_2$ | 0.25 | $SO_2$ | 7.25 | $SO_2$ | 5.5 |
| $SO_3$ | | | | | |
| $O_2$ | 1.0 | | | | |
| $CO_2$ | 13.0 | | | | |
| $H_2O$ | 10.0 | | | | |

| Stack gas*<br>Volume % | -continued<br>Copper Roaster<br>Gas<br>Volume % | Copper Converter<br>Gas<br>Volume % |
| --- | --- | --- |
| $N_2$ 76.0 | | |

*"Flue Gas Desulfurization Technology", Hydrocarbon Processing, October, 1971

**"Control of Sulfur Oxide Emissions from Primary Copper, Lead and Zinc Smelters", Journal of the Air Pollution Control Association, Vol. 21, No. 4, April, 1971.

While pressure other than atmospheric may be employed, it is generally preferred to operate at or near atmospheric pressure, since the reaction proceeds well at such pressures and the use of expensive high pressure equipment is avoided.

The apparent contact time employed in the process is not critical and it may be selected from a broad operable range generally lower than contact times for gaseous desulfurization processes of the prior art. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture. The optimum contact time will, of course, vary depending upon the composition of the stack gases to be treated, the physical and chemical condition of the supported catalyst in the reactor, and the process conditions into which desulfurization is carried. An apparent contact time less than one second, and generally less than 0.1 second, suffices.

Water is formed as a product of reaction and it has been found not to affect the course of the reaction adversely. The deliberate introduction of water in the form of steam, however, is to be avoided as the presence of water in excess of the amount normally formed in the course of the reaction, appears to provide no advantage and often gives undesirable results.

Though the desulfurization catalyst of the instant invention is operable with any conventional attritionresistant catalyst support, it is found that silica and catalyst supports containing relatively large amounts of silica appear to affect adversely the performance of the catalyst. Though gamma-alumina is a desirable catalyst support and provides excellent conversions and stability its lack of physical strength under operating conditions results in attrition of the catalyst so that where a fixed bed catalytic reactor is used, the pressure drop through the reactor builds up to over a period of time, to a level at which operation is impractical.

Suitable carrier materials are solids which are resistant to high temperatures and which are not attacked by the compounds of the gaseous mixtures to be contacted with the catalyst. Examples of suitable carrier materials are natural clays (whether or not acid pretreated), bauxite and magnesia or synthetic alumina. Alumina, in particular gamma-alumina, is a suitable carrier except that it is not sufficiently attrition resistant for prolonged use, without being mixed with clay.

The surface area of our desulfurization catalyst is not critical, but low specific surface area below about 50 $M^2$/gram is not recommend for efficiency. Best results are obtained with a catalyst support having a relatively large specific area preferably, in excess of 100 $M^2$/gram.

A particularly surprising aspect of this invention is the effect of bentonite on the strength, durability and effectiveness of gamma alumina with which it is combined to form the catalyst support. This effect of bentonite is the more interesting because cobalt sulfate supported on bentonite alone, provides less than 90 percent conversion of sulfur oxides for the same amount of cobalt sulfate.

In general, any apparatus of the type suitable for carrying out the desulfurization reaction in the vapor phase may be employed in the execution of this process. The process may be conducted in either a fixed bed or in a fluid bed reactor. A fixed bed reactor is preferred wherein the catalyst bed employs a large particulate or pelleted catalyst. A fluidized bed of catalyst may be employed but control of the reaction is more difficult. The desulfurization process, whether used in a fixed or a fluid bed, may be conducted either continuously or intermittently. In a fixed bed reactor, the reaction is most preferably conducted continuously until conversion of the sulfur oxides drops below a predetermined level at which point the catalyst may be replaced, or fortified with an additional amount of fresh catalyst. Deactivated catalyst is not regenerated.

The catalyst composition of this invention is further illustrated in the following examples wherein the amount of the various ingredients are expressed as parts by weight unless otherwise specified.

EXAMPLE

Using a ribbon blender prepare a mixture containing 48 parts gamma-alumina, 10 parts bentonite and 3 parts milled Sterotex lubricant, by blending for about fifteen minutes. The loose and packed apparent bulk density (A.B.D.) of the mixture is in the range from about 0.3 to about 0.35 g/cc. (loose), and from about 0.38 to about 0.45 g/cc. (packed), respectively. The blended mixture is slugged at ¼ inch diameter, the slug density being adjusted to give a granulated pill mix with a packed A.B.D. in the range from about 0.40 to about 0.5 g/cc. Larger or smaller diameter slugs may be made, densities being slightly lower for the larger diameters. The slugs obtained are granulated using a coarse screen so as to obtain a powder having an A.B.D. in the range from about 0.35 to about 0.45 g/cc. (loose) and from about 0.45 to about 0.55 g/cc. (packed).

The granulated powder obtained is tableted in any convenient size, ¼ diameter × ¼ inch long being preferred. The tablets are then calcined in a tunnel kiln at a temperature in the range from about 1000°C to about 1200°C so that the calcined pills have a surface area in the range from about 50 $m^2$/gm. to about 150 $m^2$/gm.

The calcined tablets are cooled and impregnated with a cobalt sulfate solution to give a final cobalt content in the range from about 4 to about 5 percent. The wet tablets, after being dried in a conventional convection oven at about 120°C until essentially dry (L.O.I. in the range from 3–5% at 600°C) have a specific gravity in the range from about 0.5 to about 0.7. Calcined crush strength of supported catalyst is in excess of 20 lbs. and a fixed bed reactor packed with tablets prepared as described hereinabove, and operated in a conventional manner, withstood continuous use in desulfurizing stack gases without degradation. The crush strength of the tablets is essentially the same prior to and after use in the reactor. By "essentially the same"

is meant that, on a statistical basis, fresh and used catalyst differ in crush strength by about 10 percent or less. The reactor is operated continuously for a prolonged period of time without loss of activity of the catalyst and with an inconsequentially slight increase in pressure drop.

What is claimed is:

1. A catalyst composition consisting essentially of cobalt sulfate deposited in a finely divided crystalline form as the essential catalytic ingredient on a catalyst support.

2. A desulfurization catalyst for the single step conversion of sulfur oxides to elemental sulfur in the presence of reducing gases containing carbon monoxide as an essential reductant, said catalyst consisting essentially of cobalt sulfate in a finely divided crystalline form supported on a catalyst support, said desulfurization catalyst containing from about ½ to about 10 parts by weight cobalt per hundred parts by weight supported catalyst.

3. The desulfurization catalyst of claim 2 wherein said catalyst support comprises porous gamma-alumina.

4. The desulfurization catalyst of claim 3 wherein said catalyst support includes, in addition, clay.

5. The desulfurization catalyst of claim 4 wherein said clay is bentonite.

6. The desulfurization catalyst or claim 2 wherein said catalyst is tableted, pelleted, or spherodized.

7. The desulfurization catalyst of claim 4 wherein the specific gravity of a tablet or pellet is in the range from about 0.5 to about 0.7.

8. The desulfurization catalyst of claim 7 wherein the tablet or pellet has a surface area in the range from about 40 to about 200 $M^2/gm$.

9. The desulfurization catalyst of claim 6 wherein the pellet has essentially the same crush strength before and after use in a desulfurization reaction.

10. The desulfurization catalyst of claim 5 wherein said catalyst support contains from about 5 to about 50 percent by weight bentonite.

* * * * *